(12) United States Patent
Schmitt (10) Patent No.: US 9,610,914 B2
(45) Date of Patent: Apr. 4, 2017

(54) ROLLOVER PROTECTION ELEMENT

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/058,547

(22) Filed: Mar. 2, 2016

(65) Prior Publication Data

US 2016/0257274 A1    Sep. 8, 2016

(30) Foreign Application Priority Data

Mar. 6, 2015    (DE) .......... 10 2015 103 308

(51) Int. Cl.
| | | |
|---|---|---|
| *B60R 21/13* | (2006.01) | |
| *B60R 21/00* | (2006.01) | |
| *B60R 21/02* | (2006.01) | |

(52) U.S. Cl.
CPC ........ *B60R 21/13* (2013.01); *B60R 2021/003* (2013.01); *B60R 2021/0018* (2013.01); *B60R 2021/0273* (2013.01); *B60R 2021/135* (2013.01)

(58) Field of Classification Search
CPC ............ B60R 21/13; B60R 2021/0273; B60R 2021/135; B60R 2021/0018; B60R 2021/003
See application file for complete search history.

(56) References Cited

U.S. PATENT DOCUMENTS

| 5,236,219 | A  * | 8/1993  | Jambor ................... B60R 21/13 280/756 |
|---|---|---|---|
| 6,817,628 | B2 * | 11/2004 | Hovelmann ............ B60R 21/13 188/377 |
| 7,198,294 | B2 * | 4/2007  | Welch ..................... B60R 21/13 280/751 |
| 7,651,131 | B2 * | 1/2010  | Kohlem .................. B60R 21/13 280/756 |

(Continued)

FOREIGN PATENT DOCUMENTS

| DE | 102007042882 A1 * | 3/2009 | ............. B60R 21/13 |
|---|---|---|---|
| DE | 102007058335 A1 * | 6/2009 | ............. B60R 21/13 |

(Continued)

OTHER PUBLICATIONS

German Search Report of Dec. 16, 2015.

*Primary Examiner* — Darlene P Condra
(74) *Attorney, Agent, or Firm* — Gerald E. Hespos; Michael J. Porco; Matthew T. Hespos (57) ABSTRACT

A rollover protection element (4) having a rollover element (5, 10, 110, 210) of elongate configuration and a bumper element (6, 11, 111, 211) connected at a free end of the rollover element (5, 10, 110, 210). The bumper element (6, 11, 111, 211) extends in a width direction of the rollover element (5, 10, 110, 210). The bumper element (6, 11, 111, 211) has a circumferential-side wall and webs that are arranged within the wall, a lower-side region of the wall of the bumper element (6, 11, 111, 211) is connected to the rollover element (5, 10, 110, 210). The webs are arranged in a curved and/or inclined manner such that none of the webs lies perpendicularly on the lower-side region of the wall.

14 Claims, 10 Drawing Sheets

(56) References Cited

U.S. PATENT DOCUMENTS

2006/0290126 A1    12/2006  Kohlem et al.

FOREIGN PATENT DOCUMENTS

| DE | 102009011066 A1 * | 9/2010 | ............. B60R 21/13 |
|---|---|---|---|
| DE | 10 2009 030 408 | 12/2010 | |
| DE | 10 2009 039 215 | 3/2011 | |
| EP | 1 736 371 | 12/2006 | |

* cited by examiner

ROLLOVER PROTECTION ELEMENT

CROSS REFERENCE TO RELATED APPLICATION

This application claims priority under 35 USC 119 to German Patent Appl. No. 10 2015 103 308.9 filed on Mar. 6, 2015, the entire disclosure of which is incorporated herein by reference.

BACKGROUND

1. Field of the Invention

The invention relates to a rollover protection element for a motor vehicle.

2. Description of the Related Art

Rollover protection elements are intended to protect the occupants of a cabriolet motor vehicle if the motor vehicle rolls over. Stationary rollover protection elements usually protrude sufficiently beyond the headrests behind the seats to protect the occupants in the case of a rollover. Deployable rollover protection elements are in a recessed position in the normal operating state, but deploy automatically if required, and assume their protective position in the deployed state.

EP 1 736 371 B1 discloses an elongate rollover protection element that can be deployed. A bumper element is provided at the free end of the rollover element and is oriented in the width direction of the rollover element. The bumper element is of solid configuration on its underside and is upwardly arcuate with a vertical dividing wall. The dividing wall lies perpendicularly on the solid underside and represents a solid resistance against deformation of the bumper element. As a result, the force profile during the deformation of the bumper body and the profile of the deformation energy during the impact are not yet optimum. Thus, the block length still is relatively high after the deformation.

It is an object of the invention to provide a rollover protection element that can absorb increased deformation energy and nevertheless permits a more consistent deformation sequence and improved protection of the vehicle occupants.

SUMMARY

The invention relates to a rollover protection element having an elongate rollover element and a bumper element connected at the free end of the rollover element. The bumper element extends in a width direction of the rollover element. More particularly, the bumper element may have a circumferential-side wall and webs arranged within the wall. A lower-side region of the wall of the bumper element is connected to the rollover element. The webs are arranged in a curved and/or inclined manner so that none of the webs lies perpendicularly on the lower-side region of the wall. As a result, the rollover protection element can be stationary or can be deployed. The bumper element is configured as a profile element on its upper side, and can absorb increased deformation energy and at the same time also exhibits a more consistent deformation sequence of the profile element due to its configuration and the arrangement of the webs and the circumferential wall.

The lower-side region of the wall of the bumper element may have a region that is curved inward into the interior of the bumper element. The region advantageously functions to support at least one web and also is deformed itself during an impact. As a result, the deformation sequence and the force profile are highly consistent.

The lower-side region of the wall may have an opening. This causes the webs to be inclined laterally and, in the case of a deformation, the edges of the opening move away from one another or toward one another. This brings about a more consistent deformation sequence and a force profile.

A plurality of webs may be provided and may protrude inward from the circumferential-side wall. As a result, star-shaped or other types of lattices of webs can be produced. These webs are supported on one another and support the circumferential wall, thereby leading to a more consistent deformation sequence.

At least some of the webs may protrude inward from the circumferential-side wall and may converge in a substantially star-shaped manner to achieve a desired force profile during the deformation.

At least one web may end on the curved region. Thus, the curved region can be pressed in during an impact, thereby advantageously influencing the force profile.

At least one web may run at an angle to the perpendicular to achieve a desired consistent force profile during deformation of the bumper element.

At least one web may be of curved configuration. As a result, a more consistent force profile is achieved during a deformation.

An improved and consistent force profile can be achieved if the circumferential-side wall has regions of different wall thickness. As a result, different regions bend to a different extent or at a different speed. Thus, a more consistent force profile can be achieved with targeted design of the wall thickness.

The rollover element may be of upwardly open configuration and/or may have a cutout in a region of the connection of the bumper element. As a result, targeted deformation of the bumper element and/or of the rollover element can be achieved.

The invention is explained in detail below with reference to the drawings.

DETAILED DESCRIPTION

Figure 1A:
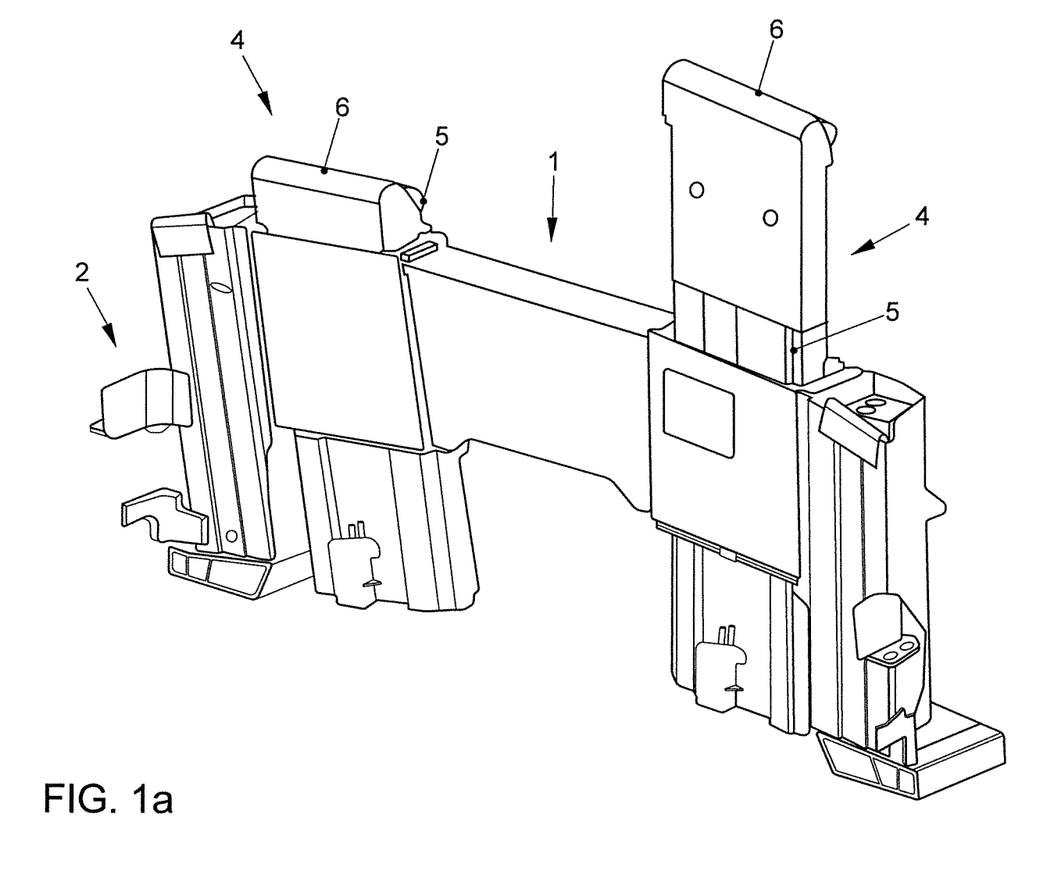
FIG. 1a is a diagrammatic perspective view of a rollover protection element.
Figure 1B:
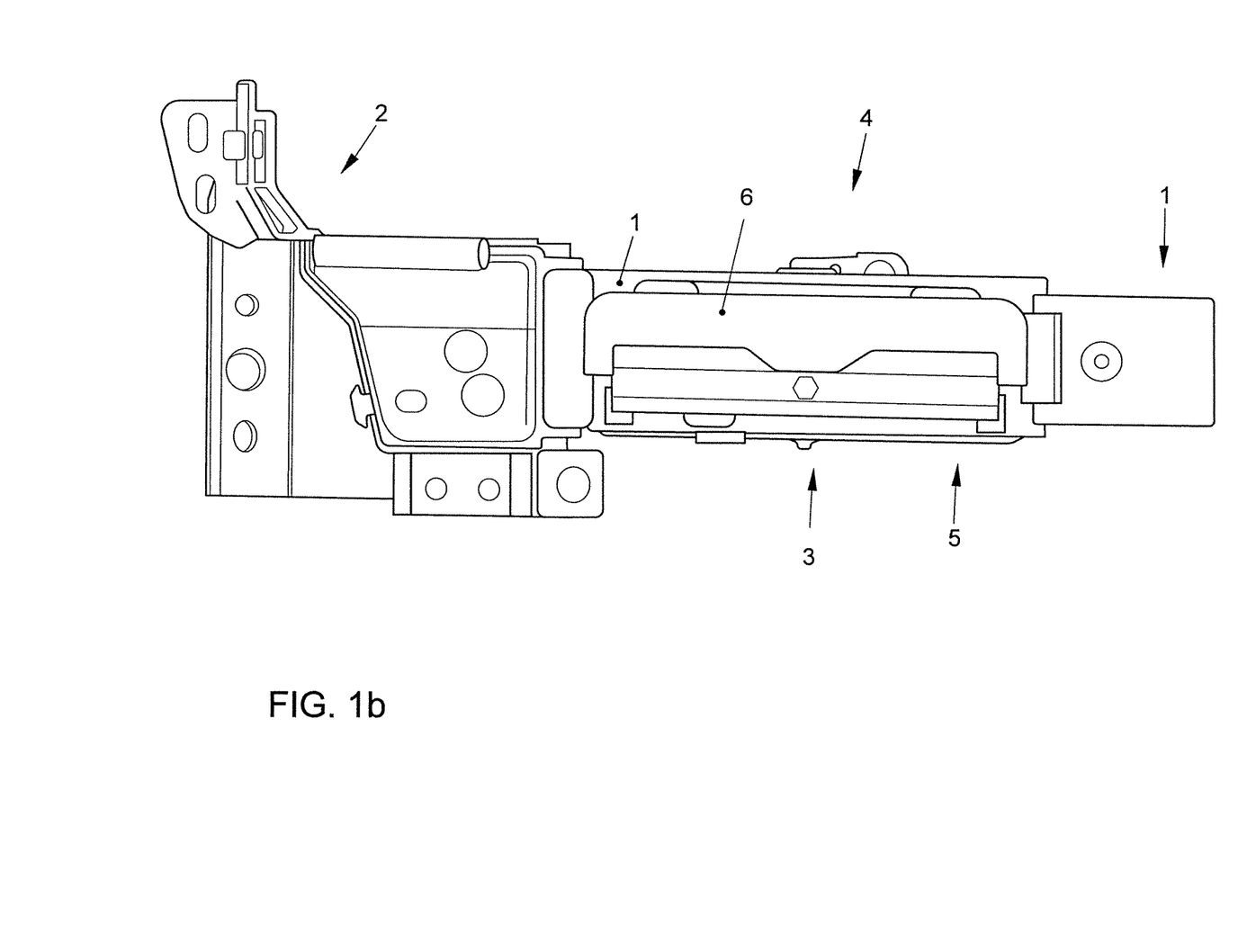
FIG. 1b is a top view of a carrier element of a vehicle body structure with a rollover protection element.

FIGS. 1a and 1b show a carrier element 1 of a vehicle body structure 2 of a motor vehicle that has a rollover protection element 4 provided as a cassette. The rollover protection element 4 has a drive mechanism 3 for deploying a rollover element 5 of the rollover protection element 4. As an alternative, the rollover protection element 4 can be installed rigidly and can be deployed in a non-automated manner.

The rollover protection element 4 has an elongate rollover element 5 that is deployed and a bumper element 6 connected as a deployable deployment element at an upper free end or end region of the rollover element 5. The bumper element 6 extends as a deformation crossmember in the width direction of the rollover element 5.

The drive mechanism preferably has a spring that is prestressed and blocked in the non-deployed state. The spring is relieved and the rollover element 5 deploys if the blocking of the spring is canceled.

FIGS. 2 to 9 show exemplary embodiments of a bumper element of this type with an upper region of a rollover element.

Figure 2:
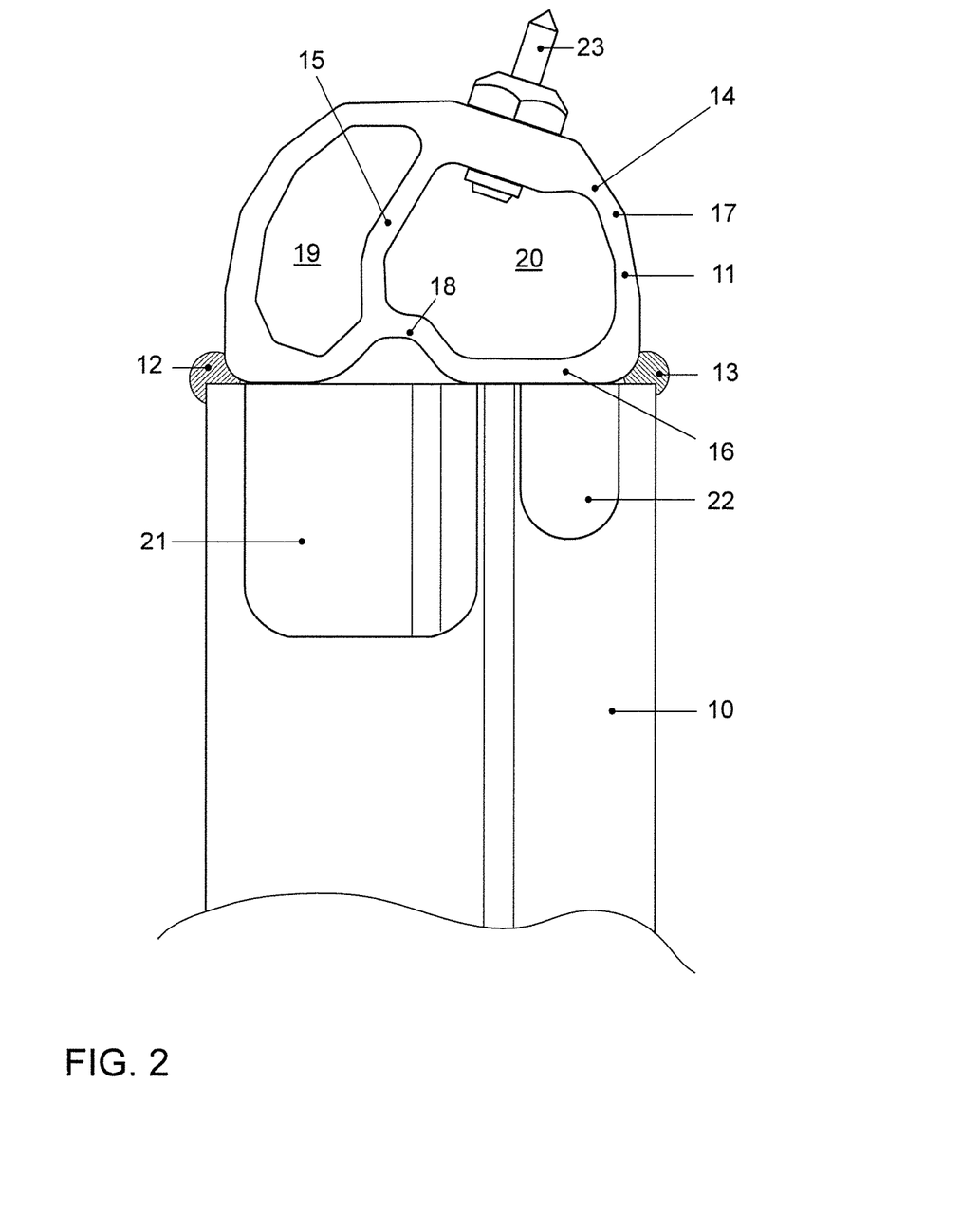
FIG. 2 is a side view of a first embodiment of the rollover protection element with a first embodiment of a bumper element.

FIG. 2 shows an upper part of a rollover element 10 that extends vertically. The bumper element 11 is at the upper end of the rollover element 10 and is connected to the rollover element 10 by welded joints 12, 13. The bumper element 11 is configured as a profile element, such as an extruded or extrusion molded profile.

The bumper element 11 has a circumferential-side wall 14 and at least one web 15 within the circumferential wall 14. The circumferential wall 14 of FIG. 2 is approximately semicircular and has a substantially planar lower wall 16 and an approximately semicircular upper wall 17. The web 15 connects the lower wall 16 to the upper wall 17. The lower wall 16 has a bulge or a curved region 18 that reaches into the interior of the profile of the bumper element 11. The web 15 connects the upper wall 17 to the bulge 18 and is curved to divide the interior space of the profile into two chambers 19, 20.

An upper region of the rollover element 10 has two adjacent upwardly open cutouts 21, 22, and the bumper element 11 can expand therein if required by deformation of the bumper element 11. The cutout 21 is wider and deeper than the cutout 22.

A spike 23 is provided on the bumper element and can penetrate an existing glass pane of the hood if required.

The wall thickness of the circumferential-side wall 14 and of the web can vary to achieve a desired force and deformation profile.

The circumferential-side wall 14 and the web 15 that extends from the bulge 18 are configured so that the web 15 is not perpendicular to the lower-side region 16 of the wall 14.

Figure 3:
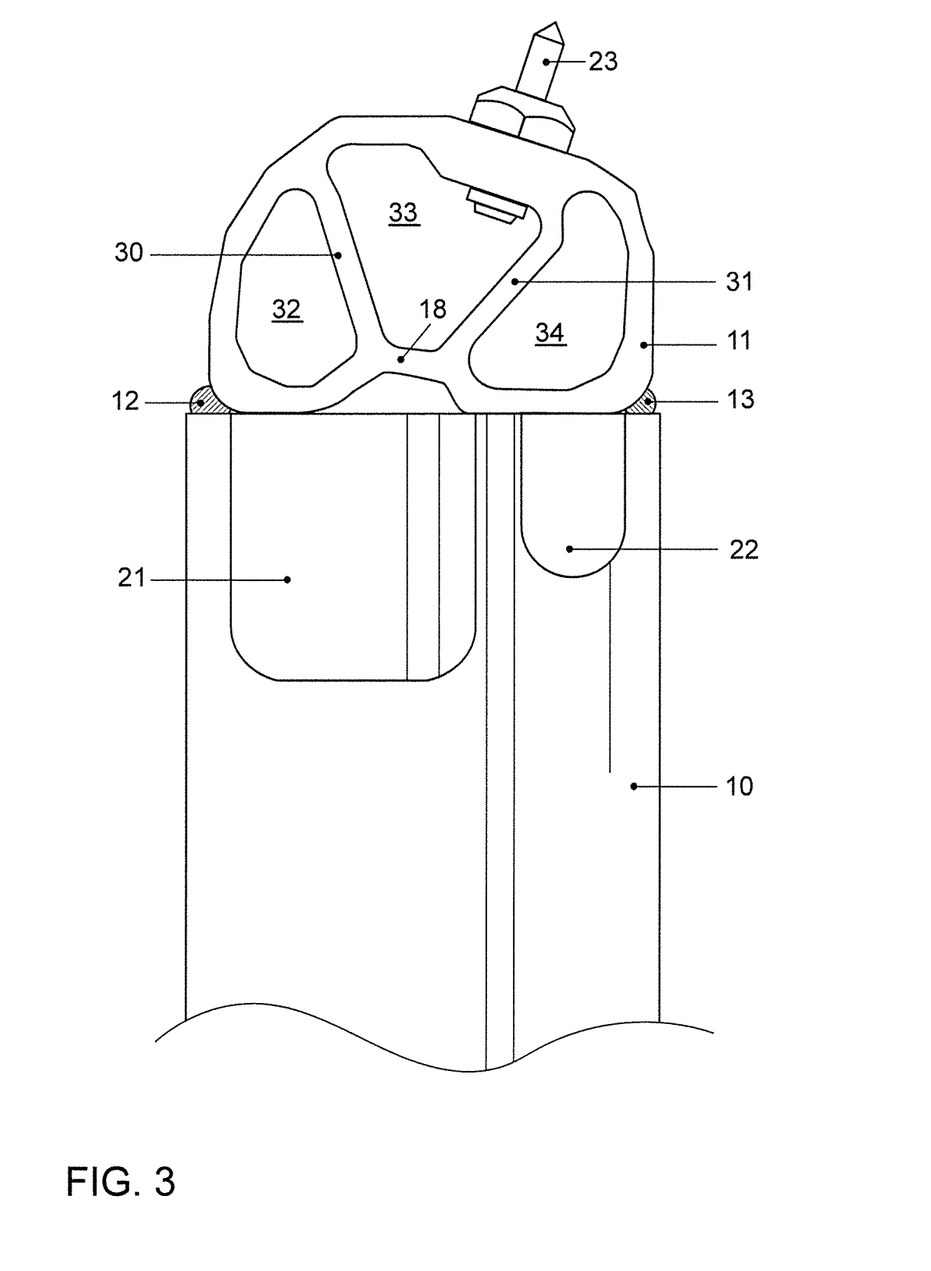
FIG. 3 is a side view of the part of the rollover protection element of FIG. 2 with a second embodiment of a bumper element.

FIG. 3 shows a second embodiment with two webs 30, 31 instead of the one web 15 in FIG. 2. Otherwise, the embodiments of FIGS. 2 and 3 are similar. The web 30 runs in a somewhat curved manner and at an angle with respect to the vertical on the left-hand side of the center of the profile of the bumper element 11. The web 31 also runs in a somewhat curved manner and at an angle with respect to the vertical on the right side of the center of the profile of the bumper element 11. The two webs run toward one another in an approximately v-shape and end at the bottom at the bulge 18. The webs 30, 31 form three chambers 32, 33, 34.

Figure 4:
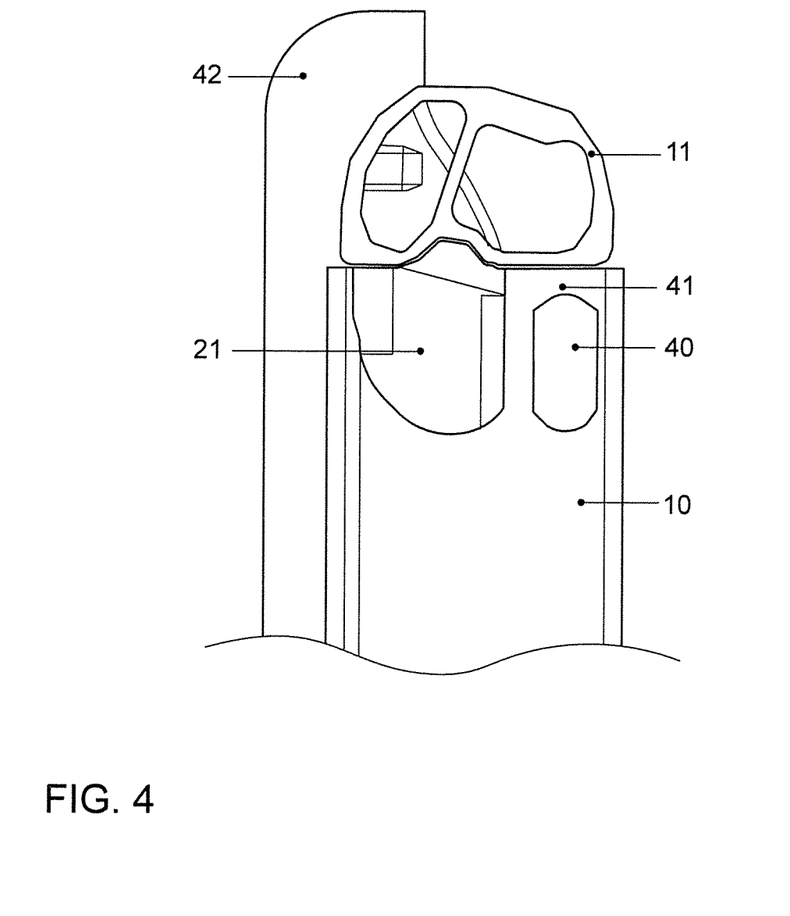
FIG. 4 is a side view of a part of a second embodiment of the rollover protection element with a variation of the bumper element of FIG. 2.

FIG. 4 shows an alternative embodiment of FIG. 2, where an upwardly closed cutout 40 is provided instead of the upwardly open cutout 22 of FIG. 2. In other respects, the embodiments of FIGS. 2 and 4 are similar. The cutout 40 has a web 41 that closes the cutout to the top. The web 41 influences the deformation of the bumper element 11 because the substrate is locally not as flexible as in FIG. 2. A covering 42 also is shown in FIG. 4 and at least partially covers the bumper element 11.

Figure 5:
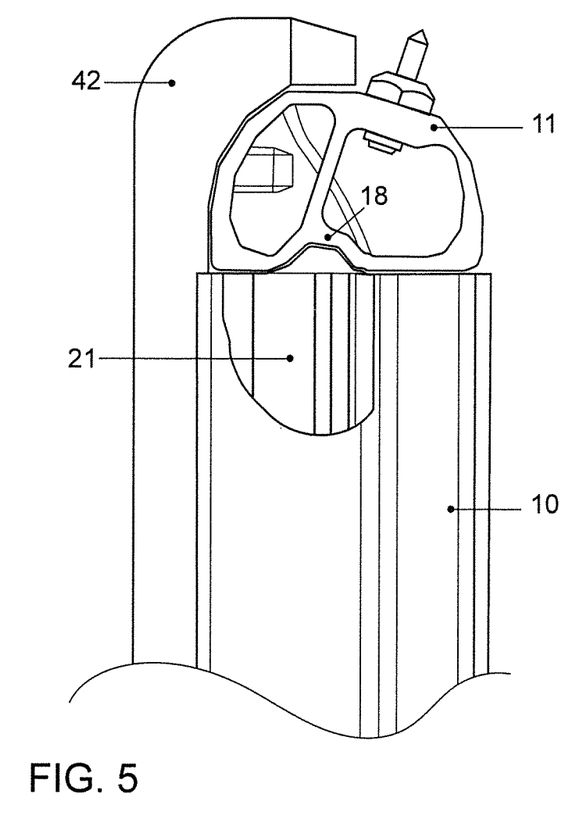
FIG. 5 is a side view of a part of a third embodiment of the rollover protection element with a the bumper element of FIG. 4 and the spike of FIG. 2.

FIG. 5 shows a further alternate to the rollover protection element of FIGS. 2 and 4, in which, instead of the upwardly open cutout 22 of FIG. 2 or the upwardly closed cutout 40, no such cutout is provided. Otherwise, the embodiment is in accordance with the embodiment shown in FIGS. 2 and 4. Reference is made to the corresponding description in this regard. The cutout, which is not present locally, influences the deformation of the bumper element 11 because the substrate is locally not as flexible as shown in FIGS. 2 and 4.

The upwardly open cutout 21 is provided merely in the region of the bulge 18.

The way size, shape and location of the cutouts 22, 21, 40 depends critically on the desired profile shape of the bumper element 11 and the relevant profiles of the rollover element.

Figure 6:
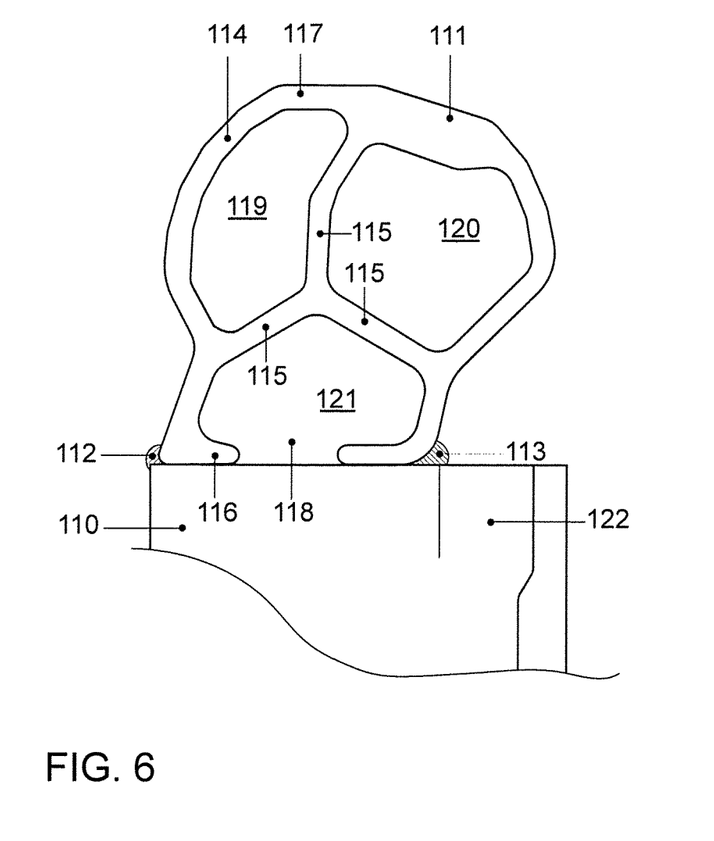
FIG. 6 is a side view of part of a rollover protection element with a third embodiment of the bumper element.
Figure 7:
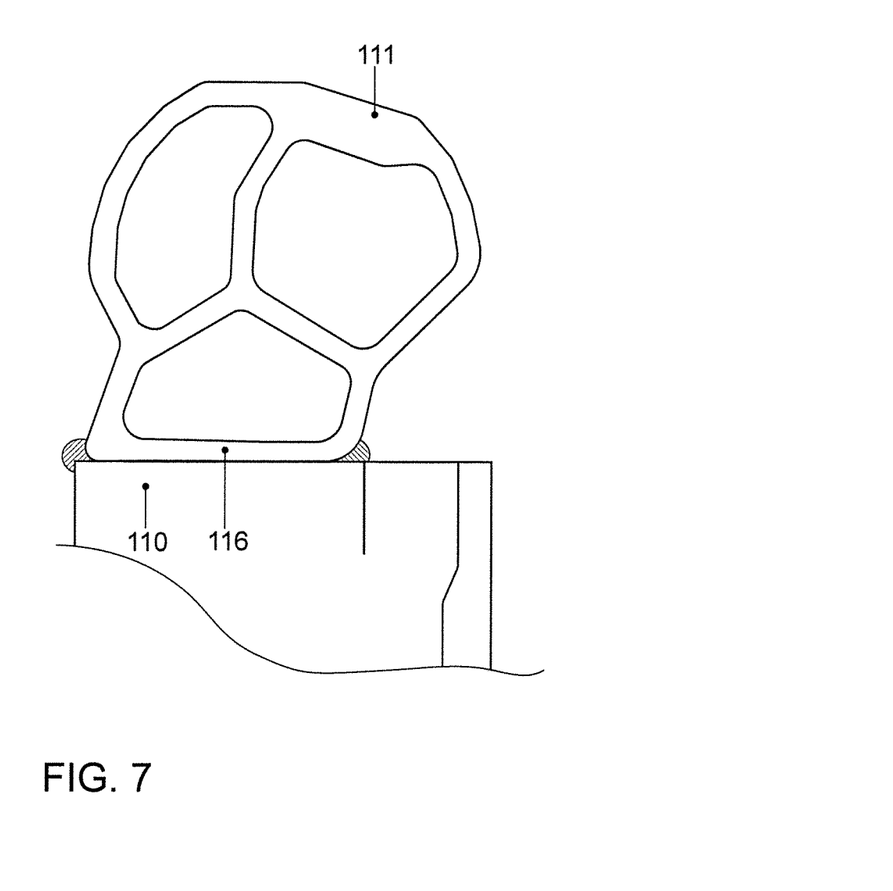
FIG. 7 is a side view of a part of a rollover protection element with a variation of the bumper element of FIG. 6.
Figure 8:
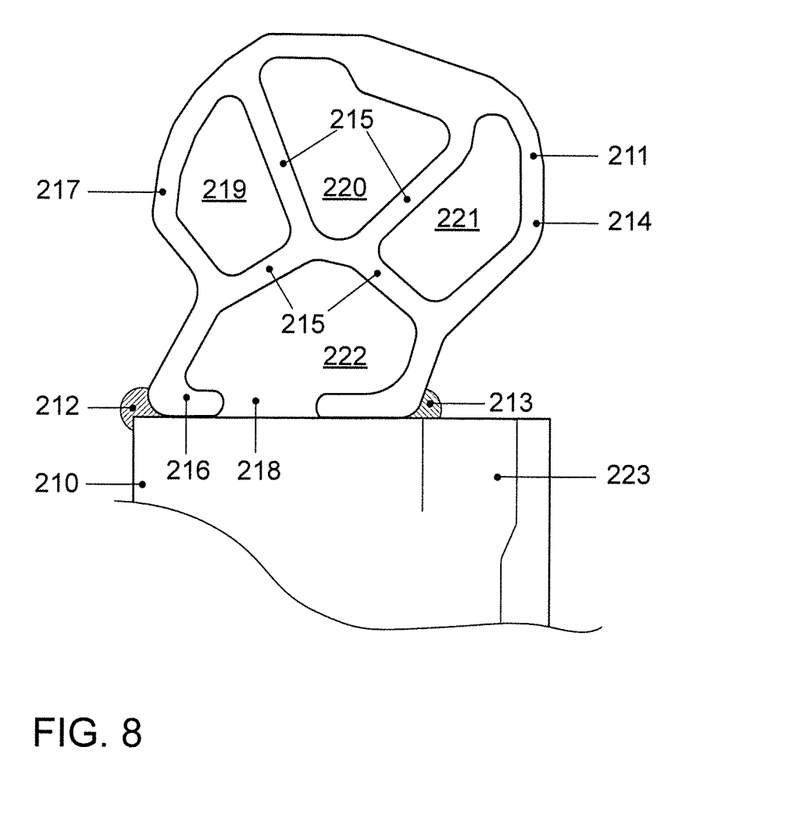
FIG. 8 is a side view of a part of a rollover protection element with a fourth embodiment of the bumper element.
Figure 9:
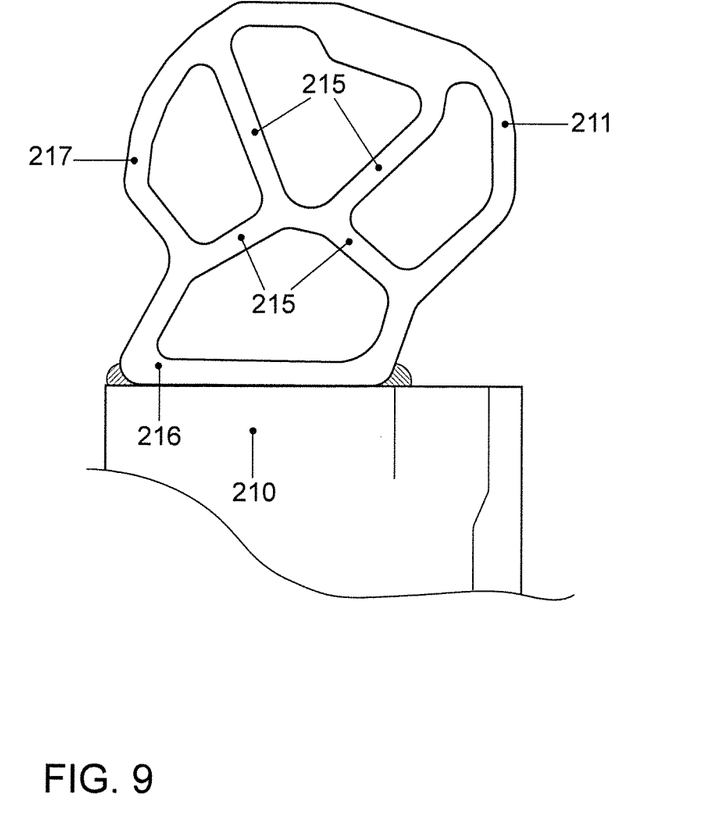
FIG. 9 is a side view of a rollover protection element with a variation of the bumper element of FIG. 8.

FIGS. 6 to 9 show further embodiments. The embodiments of FIGS. 6 and 7 are similar, and the embodiments of FIGS. 8 and 9 are similar.

FIG. 6 shows an upper part of a rollover element 110 that extends vertically. The bumper element 111 is connected to the upper end of the rollover element 110 by welded joints 112, 113. The bumper element 111 is configured as a profile element, such as an extruded or extrusion molded profile.

The bumper element 111 has a circumferential-side wall 114 and three webs 115 are within the wall 114, as shown in FIG. 6.

Here, in the exemplary embodiment of FIG. 6, the circumferential wall 114 of FIG. 6 is configured to be shaped irregularly with a substantially planar lower wall 116 and an upwardly widening upper wall 117. The webs 115 connect regions of the upper wall 117 to one another. The lower wall 116 has an opening 118.

The upper web 15 is curved, whereas the lower two webs are approximately straight. The webs 115 are arranged in an approximately star-shaped pattern and divide the interior space of the profile into three chambers 119, 120, 121.

In the upper region, the rollover element 110 has an upwardly open cutout 122 to permit a targeted deformation of the bumper element 111 to take place.

The wall thickness of the circumferential-side wall 114 and of the webs can vary, such that a desired force and deformation profile results.

FIG. 7 shows an alternate to the embodiment of FIG. 6, in which the lower wall closed and has no opening comparable to the opening 118 of FIG. 6. In other respects, the embodiment of FIG. 7 is similar to the embodiment of FIG. 6.

FIG. 8 shows the upper part of a vertical rollover element 210. A bumper element 211 is connected at the upper end of the rollover element 210 by welded joints 212, 213. The bumper element 211 is configured as a profile element, such as an extruded or extrusion molded profile.

The bumper element 211 has a circumferential-side wall 214 and webs 215 within the wall 214. Four webs 215 are shown in FIG. 8 and are arranged in an approximately star-shape. The circumferential wall 214 is shaped irregularly with a substantially planar lower wall 216 and an upwardly widening upper wall 217. The webs 215 connect regions of the upper wall 217 to one another. The lower wall 216 has an opening 218.

The two upper webs 215 are of somewhat curved configuration, whereas the lower two webs are approximately straight. The webs 215 are arranged in an approximately star-shape and divide the interior space of the profile into four chambers 119, 120, 121, 122.

The upper region of the rollover element 210 has an upwardly open cutout 223 that allows a targeted deformation of the bumper element 211 to take place.

The wall thickness of the circumferential-side wall 214 and of the webs can vary, such that a desired force and deformation profile results.

FIG. 9 shows an alternative to the embodiment of FIG. 8, in which, instead of the opening 218, the lower wall is configured without an opening, that is to say is closed. In other respects, the embodiment of FIG. 9 is similar to FIG. 8.

LIST OF DESIGNATIONS

1 Carrier element
2 Vehicle body structure
3 Drive mechanism
4 Rollover protection element
5 Rollover element
6 Bumper element
10 Rollover element
11 Bumper element
12 Welded joint
13 Welded joint
14 Wall
15 Web
16 Wall
17 Wall
18 Bulge
19 Chamber
20 Chamber
21 Cutout
22 Cutout
23 Spike
30 Web
31 Web
32 Chamber
33 Chamber
34 Chamber
40 Cutout
41 Web
42 Covering
110 Rollover element
111 Bumper element
112 Welded joint
113 Welded joint
114 Wall
115 Web
116 Wall
117 Wall
118 Opening
119 Chamber
120 Chamber
121 Chamber
122 Cutout
210 Rollover element
211 Bumper element
212 Welded joint
213 Welded joint
214 Wall
215 Web
216 Wall
217 Wall
218 Opening
219 Chamber
220 Chamber
221 Chamber
222 Chamber
223 Cutout

What is claimed is:

1. A rollover protection element having an elongate rollover element and a bumper element connected at a free end of the rollover element, the bumper element extending in a width direction of the rollover element and having a circumferential-side wall and at least one web arranged within the circumferential-side wall, a lower-side region of the circumferential wall of the bumper element being connected to the rollover element, the at least one web being arranged in a curved manner such that no web lies perpendicularly on the lower-side region of the circumferential-side wall.

2. The rollover protection element of claim 1, wherein the at least one web comprises plural webs that protrude inward from the circumferential-side wall.

3. The rollover protection element of claim 2, wherein the webs protrude inward from the circumferential-side wall and converge in a substantially star-shaped manner.

4. The rollover protection element of claim 2, wherein the plural webs include the at least one web that is arranged in a curved manner and at least one web that runs at an angle with respect to a plane that is perpendicular to the lower-side region of the circumferential-side wall.

5. The rollover protection element of claim 1, wherein the circumferential-side wall has regions of different wall thickness.

6. The rollover protection element of claim 1, wherein the rollover element is of upwardly open configuration and/or has a cutout in a region of the connection of the bumper element.

7. A rollover protection element having an elongate rollover element and a bumper element connected at a free end of the rollover element, the bumper element extending in a width direction of the rollover element and having a circumferential-side wall and at least one web arranged within the circumferential-side wall, a lower-side region of the circumferential wall of the bumper element being connected to the rollover element, the at least one web being arranged in a curved and/or inclined manner such that no web lies perpendicularly on the lower-side region of the circumferential-side wall, wherein the lower-side region of the circumferential-side wall has an outwardly concave curved region that forms an inwardly convex curved region facing into the interior of the bumper element.

8. The rollover protection element of claim 7, wherein the at least one web ends on the curved region.

9. The rollover protection element of claim 7, wherein the at least one web is curved.

10. The rollover protection element of claim 7, wherein the at least one web comprises plural webs that protrude inward from the circumferential-side wall.

11. The rollover protection element of claim 10, wherein the webs protrude inward from the circumferential-side wall and converge in a substantially star-shaped manner.

12. A rollover protection element having an elongate rollover element and a bumper element connected at a free end of the rollover element, the bumper element extending in a width direction of the rollover element and having a circumferential-side wall and at least one web arranged within the circumferential-side wall, a lower-side region of the circumferential wall of the bumper element being connected to the rollover element, the at least one web being arranged in a curved and/or inclined manner such that no web lies perpendicularly on the lower-side region of the circumferential-side wall, and wherein the lower-side region of the circumferential-side wall has an opening.

13. The rollover protection element of claim 12, wherein the at least one web comprises plural webs that protrude inward from the circumferential-side wall.

14. The rollover protection element of claim 13, wherein the webs protrude inward from the circumferential-side wall and converge in a substantially star-shaped manner.

* * * * *